United States Patent [19]

Ishizaka et al.

[11] 4,035,904
[45] July 19, 1977

[54] AUTOMATIC ARTICLE WORKING SYSTEM

[75] Inventors: Susumu Ishizaka; Taizo Kondo, both of Komatsu; Hiroshi Shoda, Kaga; Masakatsu Sugimoto, Komatsu, all of Japan

[73] Assignee: Kabushiki Kaisha Komatsu Seisakusho, Tokyo, Japan

[21] Appl. No.: 618,937

[22] Filed: Oct. 2, 1975

[51] Int. Cl.² .................. B23Q 7/00; B23P 23/00
[52] U.S. Cl. .................................. 29/563; 29/564; 214/16.4 A
[58] Field of Search ........................ 29/563, 564; 214/16.4 A, 16.4 B

[56] References Cited

U.S. PATENT DOCUMENTS

| | | | |
|---|---|---|---|
| 3,543,392 | 12/1970 | Perry et al. | 29/564 X |
| 3,662,860 | 5/1972 | Burch | 214/16.4 A |
| 3,737,056 | 6/1973 | Hathcock, Jr. | 214/16.4 A |

Primary Examiner—Gil Weidenfeld
Attorney, Agent, or Firm—Armstrong, Nikaido & Marmelstein

[57] ABSTRACT

An automatic article working system particularly suitable for limited production of a variety of articles. The system comprises a plurality of pallets for loading articles to be worked, each of the pallets being used as a member for conveying the articles to be worked between machine, tools, pallet conveyor means, pallet storing means located on both sides of the pallet conveyor means, and pallet transfer means adapted to move a pallet in and out of the pallet storing means. A plurality of machine tools are adapted to work the articles, and manipulators are provided to convey the articles to be worked from a pallet which has been removed from the storage means to the machine tools and to return worked articles back to the pallet. A computer is operatively connected to all of the means to effect control thereof.

7 Claims, 12 Drawing Figures

AUTOMATIC ARTICLE WORKING SYSTEM

BACKGROUND OF THE INVENTION

1. Field of the Invention

This invention relates to an automatic article working system, and more particularly to an automatic article working system suitable for limited production of a variety of articles.

2. Description of the Prior Art

The automatic article working systems which have heretofore been used are generally suitable for the mass production of one kind of article in a stationary flow. In these systems, articles to be worked are automatically conveyed by means of special purpose conveyor means and measuring means to the machine tools located in a predetermined sequence of working steps.

Such automatic article working systems are, however, not suitable for limited production of a variety of articles.

Specifically, the prior art systems are not suitable when the articles to be worked have various shapes and are allowed to flow on the production line, and so the flow of articles to be worked is not constant. The special purpose machine tools and the conveying facilities do not have working and conveying functions suitable for the articles which have different configurations or shapes.

The diversification of the shapes of articles to be worked and the path through which articles to be worked travel requires general purpose machine tools and conveying means. Under such conditions, automatic working devices are required to prevent a decline of the rate of operation of the system. The line production system can be considered as one of the solutions thereof. In this system, according to PQ analysis and G.T technique, the kinds of articles to be worked are reduced as far as possible, and articles to be worked having similar shapes and sizes are selected and worked in principle by a predetermined series of machines located in the sequence of work steps in accordance with a predetermined tact time of one to one.

However, the kinds of articles to be automatically worked by such a line production system are limited. With an increase in the kinds of articles to be worked, many problems have occurred, and even when machine tools are automated, most of the conveying steps unavoidably depend on manpower.

For this reason, following automatic article working system suitable for limited production of a variety of articles is contemplated at present. Conveying facilities of a general purpose type such as conveyors, chutes and manipulators, etc. are arranged between N. C general purpose machine tools and automatic article working systems, etc. and one piece of the articles to be worked is loaded on a pallet or a truck and then transferred. Further, for the purpose of controlling work steps, waiting lines for articles to be worked and corresponding branch and joining means are provided along the conveying path. However, this system is disadvantageous in that, because only one piece is loaded on a pallet or a truck and conveyed individually, a large number of pallets or trucks are required, so that loading and unloading steps of the articles to be worked increase. Further, work step control is required by the one piece, and it is necessary to use a computer having a large capacity for this small operation. Furthermore, in order to control various kinds of articles to be worked requiring different work steps, it is necessary to provide a waiting line for subsequent work steps, and due to the branch and joining means for selectively feeding articles to be worked into work steps, large facilities and floor space are required, and the running cost thereof increases.

SUMMARY OF THE INVENTION

It is, therefore, an object of the present invention to provide an automatic article working system which is free of the above-mentioned disadvantages and is suitable for the limited production of a variety of articles.

Another object of the present invention is to provide an automatic article working system, wherein all the associated means are collectively controlled by a control system comprising a mini-computer as a heart thereof.

DETAILED DESCRIPTION OF THE INVENTION

Figure 1:
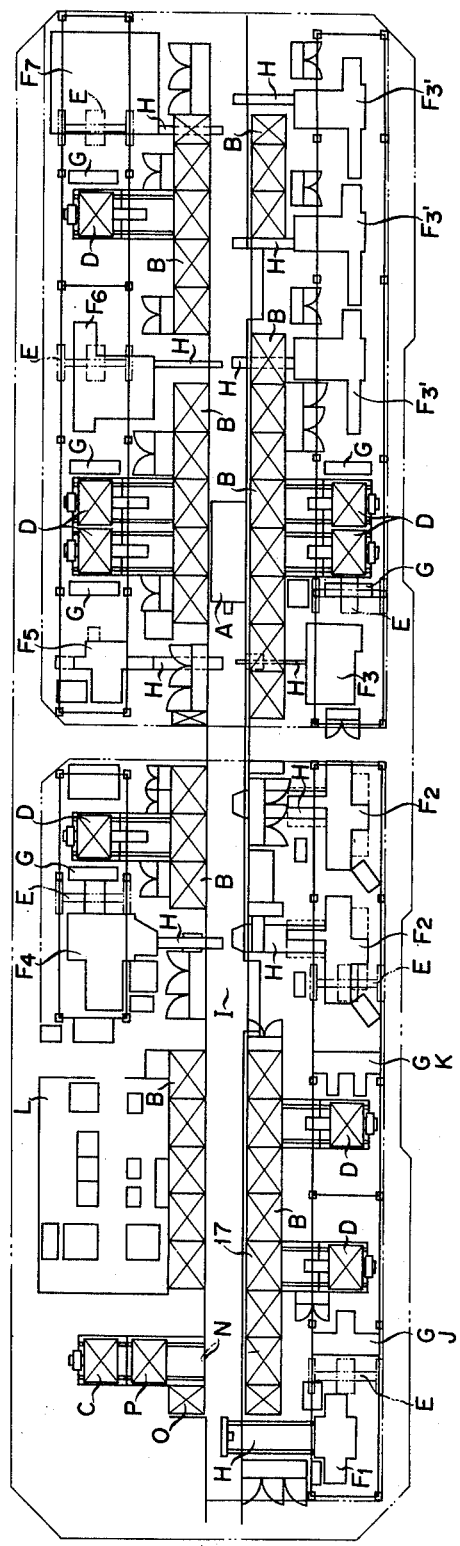
FIG. 1 is a plan view, showing the schematic arrangement of an automatic article working system of the present invention.

One embodiment of the present invention will now be described below with reference to the accompanying drawings. Reference character A denotes pallet conveyor means freely movable upwardly and downwardly and along a rectilinearly arranged path for conveying pallet. On both sides of the pallet conveyor means A, there is a plurality of pallet storing means B disposed at properly spaced intervals. Further, on both sides of the pallet conveyor means A in the direction of movement thereof, there are provided pallet transfer means C, adapted to transfer a pallet M to and from the pallet conveyor means A.

Reference character D indicates pallet transfer and storing means adapted to remove a pallet stored in the pallet storing means B, transfer it to the range of action of the manipulator E and transfer the same pallet M back to the pallet storing means B. Workpieces such as shafts, etc. taken out by the pallet transfer and storing means D and arranged on the pallet M are conveyed by the manipulator E to respective machine tools F. The workpieces are worked by the machine tools F respectively and then brought back by the manipulator E on their original positions on the pallet M. Between the pallet transfer and storing means D and the machine tools F, there is provided a longitudinal workpiece positioning detecting means G, which can effect longitudinal positioning and check the dimension of the shaft parts taken from the pallet M by the manipulator E. The shaft parts are conveyed to the machine tools F after longitudinal positioning and dimensional checking is completed by the workpiece positioning and detecting means G and therefore, no wrong working is effected.

The machine tools F will now be described in detail below. Machine tool $F_1$ is a milling and centering machine, which can work both end faces and center hole of the shaft part. Machine tool $F_2$ is a N. C automatic lathe which effects the first and second steps of cutting the outside diameter portion of the shaft part. Machine tool $F_3$ is a spline hobbing machine which effects the involute spline work. In particular, machine tools $F_3'$ can work involute spline shafts of the same specification, and three sets are disposed in a row to minimize steps. Machine tool $F_4$ is a drill tapping machine, which can work holes on the end faces of the shaft part. Machine tool $F_5$ is a N. C turret mirror which can cut key ways and oil holes. Machine tool $F_6$ is a gun drill machine, which can work an oil hole in the center of the shaft. Machine tool $F_7$ is an automatic flash removing machine which serves to remove the flashes produced by spline, key-way and oil hole cutting tools.

Reference character H denotes a sub-chip conveyor which serves to bring chips produced during the cutting work step by the machine tools F into a main chip conveyor I. The chips brought into the main chip conveyor I are conveyed outside of the line.

Reference character J represents a device for measuring the overall length of a part and the depth of the center hole thereof, after the milling and centering works are effected. This device is formed as an integral part of the above-mentioned workpiece positioning and detecting means G. Reference character K indicates an outside diameter measuring means which measures the outside diameter of the workpiece after the outside diameter portion is cut and is formed as an integral part of the above-mentioned workpiece positioning and detecting means G. Reference character L denotes a control room where operational indications are sent to all of the above-mentioned means.

The construction and operation of the various components of the system will now be described below.

Figure 2:
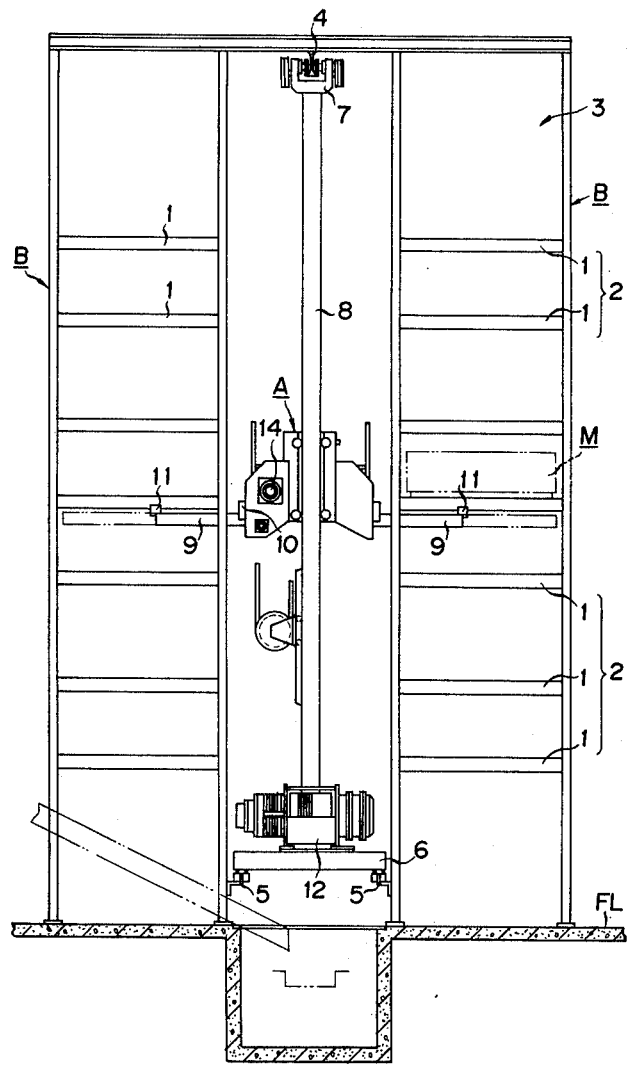
FIG. 2 is a sectional view of a pallet conveyor means and pallet storing means.
Figure 3:
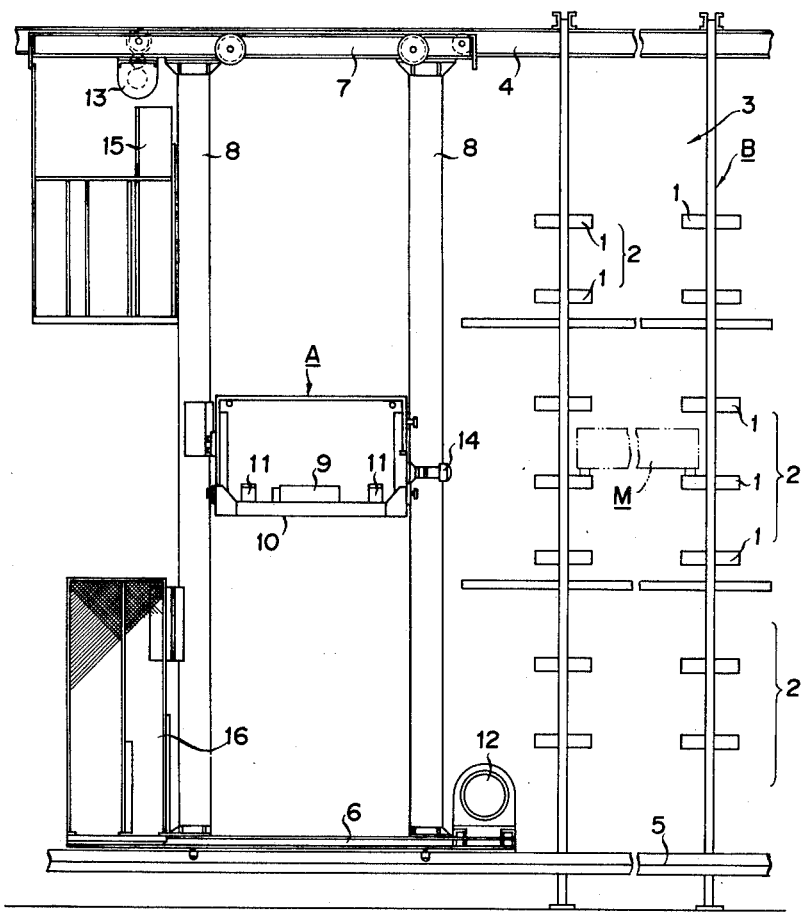
FIG. 3 is a plan view of FIG. 2.

A. Pallet conveyor means A and pallet storing means B (FIGS. 2 and 3)

The pallet conveyor means A and the pallet storing means B serve to convey and store a pallet M between the work steps. The pallet storing means B comprises pallet storing shelves 3, disposed in opposed and parallel relationship in proper positions on both sides of the direction of conveyance. Each of the pallet storing shelves includes unit storing shelves 2, each comprising a plurality of vertically disposed pallet loading stages 1 disposed in a row in the direction of conveyance. Between the oppositely arranged pallet storing shelves 3 there are provided upper and lower guide rails 4 and 5, fixedly secured and extending in the direction of conveyance. A travelling member comprising a lower travelling bed 6, an upper travelling frame 7 and masts 8 rigidly connected to the bed 6, and the frame 7 is mounted so as to freely slide along the upper and lower guide rails 4 and 5. Further, an elevating pallet loading bed 10, having a pair of forks 9 adapted to be brought in and out from the pallet loading stages 1 on both sides, is mounted on the mast 8 so as to freely slide in the vertical direction. In front of each fork 9 and on the elevating pallet loading base 10, there are provided pallet detector means 11. Each of the pallet detector means 11 is operatively connected with the fork 9, the elevating pallet loading base 10 and every driving port of the travelling member. The pallet M can be taken out from the predetermined position on the storing shelves 3 and loaded on the elevating pallet loading base 10 by means of the fork 9. By elevating the elevating pallet loading base 10 and moving the travelling member along the upper and lower guide rails 4 and 5 at the same time, the pallet on the base 10 can be moved to a desired position where it is stored and then placed by the fork 9 on the pallet loading stage 1. The pallet conveyor means A is thus constructed so that the pallet M can be conveyed in a simple manner from one storing position to another desired storing position and is stored thereon.

Furthermore, the pallet detector means 11 is provided respectively in front of the fork 9, and upon the elevating of pallet loading base 10, is operatively connected with every driving power source so that the presence of the pallet in the predetermined storing position on the storing shelves 3 and on the elevating pallet loading base 10 can be detected. Based on the result of detection, operation of every driving power source can be controlled, thereby preventing possible wrong operation at the time of moving a pallet in or out.

The elevating winch motor 12 functions to raise and lower the loading base 10 and a travelling power source 13 moves the loading base 10 back and forth. The elevating winch motor 12 and the travelling power source 13 are controlled for their movement by signals from a programmed computer in order to move the pallets from a first position to a second position which requires a pallet. More specifically, the computer serves to give only a predetermined storing position (indication of destination of the conveyor means A) and a type of operation (putting in or removing the pallet) as control signals to a control panel 15. The operation and sequence for driving power sources 12, 13 and 14 for travelling and elevating the travelling member and moving the forks inwardly and outwardly are controlled thereby.

Furthermore, in case of an emergency, the travelling member can be independently and slightly moved by means of an operating panel 16 installed on the lower travelling bed 6 without depending on the control indications from the computer.

Figure 4:
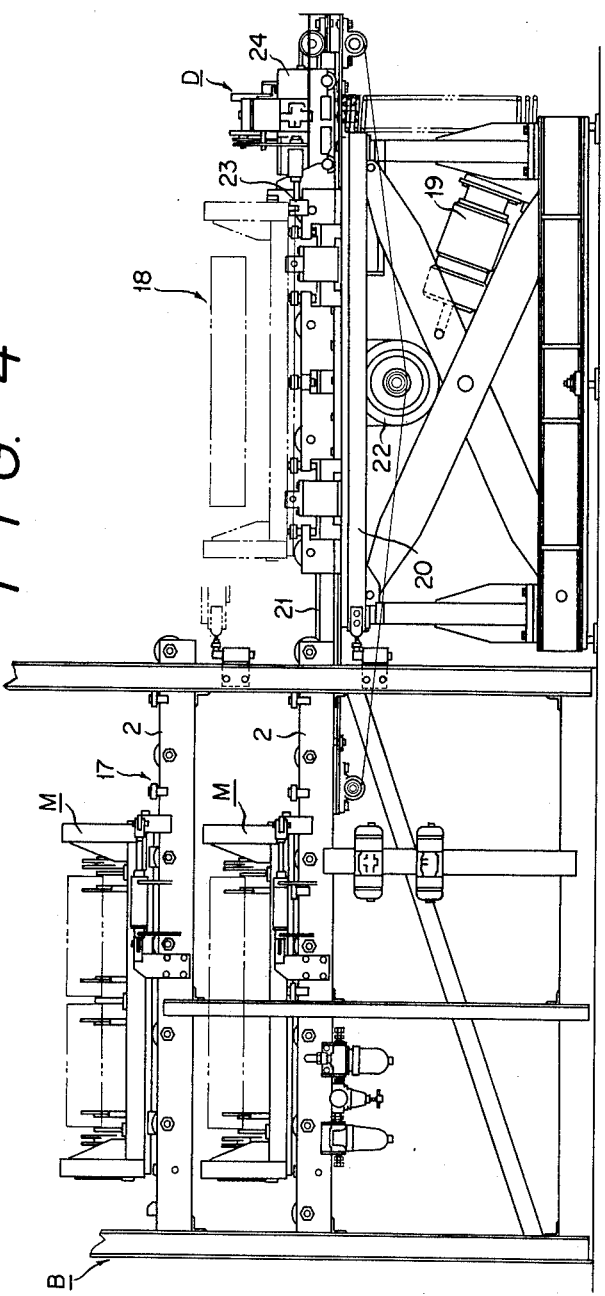
FIG. 4 is a plan view of pallet transfer means.

B. Pallet transfer and storing means D (Refer to FIG. 4)

The pallet transfer and storing means D serves to move the pallet M between the range of action of the pallet conveyor means A and that of the manipulator E. Means D is divided into rack portions 17 where the pallet is transferred to the pallet conveyor means A, and a developing portion 18, which moves the pallet inwardly and outwardly, moves it into the range of action of the manipulator E.

The rack portions 17 serve also as first and second stage unit storing shelves 2 of the pallet storing means B. These rack portions 17 are holding stations for pallet M which are brought by the pallet conveyor means A and loaded with blank workpieces or pallets M which are loaded with finished workpieces and are ready to be taken out.

The developing portion 18 comprises an elevating base 20, which can be lifted in upper and lower stages by means of lifter means 19, and a pallet moving member 24 having a clamping pawl 23 engageable with the pallet M driven by a travelling power source 22 along a track 21 secured on the bed 20.

The provision of the pallet transfer and storing means D of such construction enables vertical positioning of the elevating base 20 by means of the lifter means 19 relative to the upper and lower unit storing shelves 2 of the pallet storing means B, pushing of the pallet M by means of the pallet moving member 24 onto the upper and lower unit storing shelves 2 or removing the pallet M from the shelves 2. Due to such construction, the pallet M loaded with a blank workpiece can be taken in without waiting for the pallet M loaded with a finished workpiece to be taken out by the pallet conveyor means A, so that efficient operation can be carried out.

Figure 6:
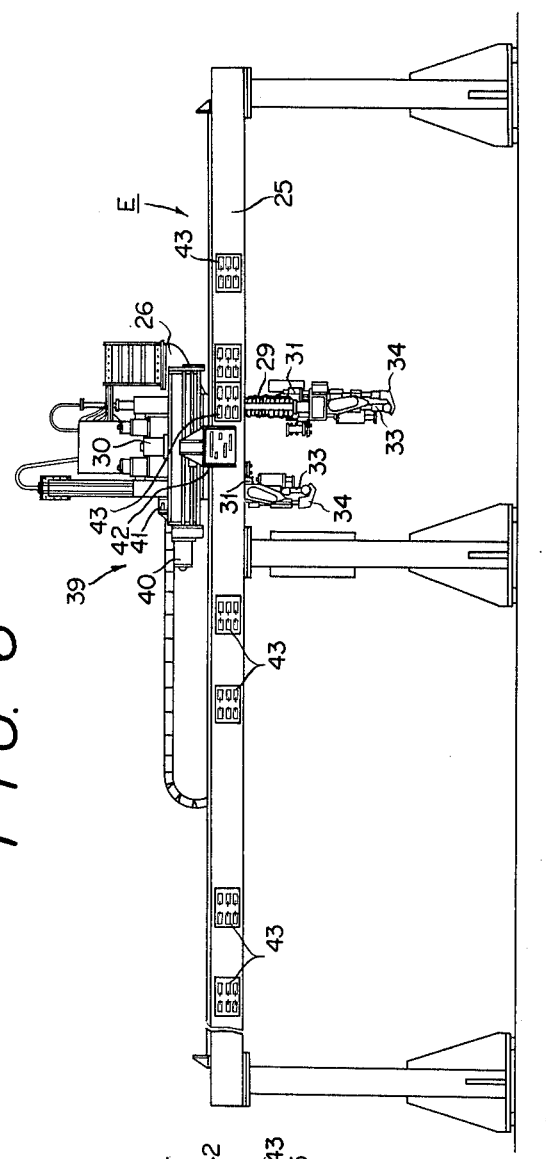
FIG. 6 is a front view of the manipulator of FIG. 5.
Figure 7:
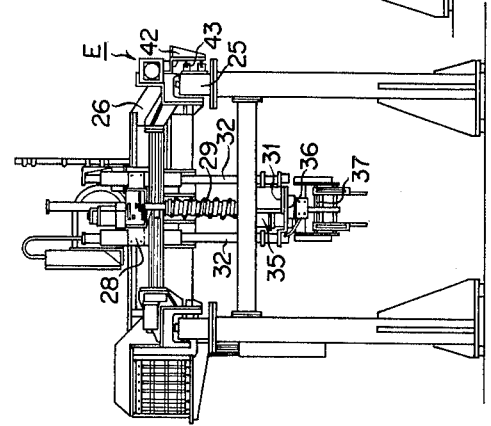
FIG. 7 is a side elevational view of the manipulator of FIG. 5.

C. Manipulator E (Refer to FIGS. 5, 6 and 7)

The manipulator E serves to move the workpiece on the pallet M transferred by the pallet transfer and storing means D to each working station (machine tools F and measuring and detector means G, J, and K) or move the workpiece from each working station back to the pallet M.

The principal components of the manipulator will be schematically described below. Reference numeral 25 denotes gate-shaped tracks having a carriage 26 mounted thereon, so as to slide in the direction of the X axis. The movable carriage 26 which moves in the direction of the X axis is provided with a travelling power source 27 which provides rotary power to a pinion engageable with a rack gear (not shown) formed in the track 25 to move the carriage.

Reference numeral 28 indicates a carriage movable in the direction of the Y axis and mounted on the carriage 26 movable in the direction of Y axis. The carriage 28 is also provided with a travelling power source (not shown) and is capable of moving in a direction at right angles to the direction of movement of the carriage 26.

Further, the carriage 28 movable in the direction of the Y axis is provided with a pair of ball screw rods 29, freely movable by means of a driving power source 30 in the vertical direction. The ball screw rods 29 serves to vertically move a holding member 31 along a pair of guide rods 32.

Reference numerals 33 and 34 represent clamping pawls for holding a workpiece.

The clamping pawls 33 and 34 are rotatably carried relative to the holding member 31, and can be rotated by means of a rotary power source 35.

The horizontal space interval between the clamping pawls 33 and 34 can be adjusted by means of a ball screw 37 which is rotated by a rotary power source 36.

Next, positioning of the movable carriages 26 and 28 will be mentioned below. The carriage 26, movable in the direction of X axis, is provided with positioning means 38 which positions a workpiece in the direction of X axis, and the carriage 28, movable in the direction of Y axis, is provided with positioning means 39 which positions the workpiece in the direction of Y axis.

Figure 5:
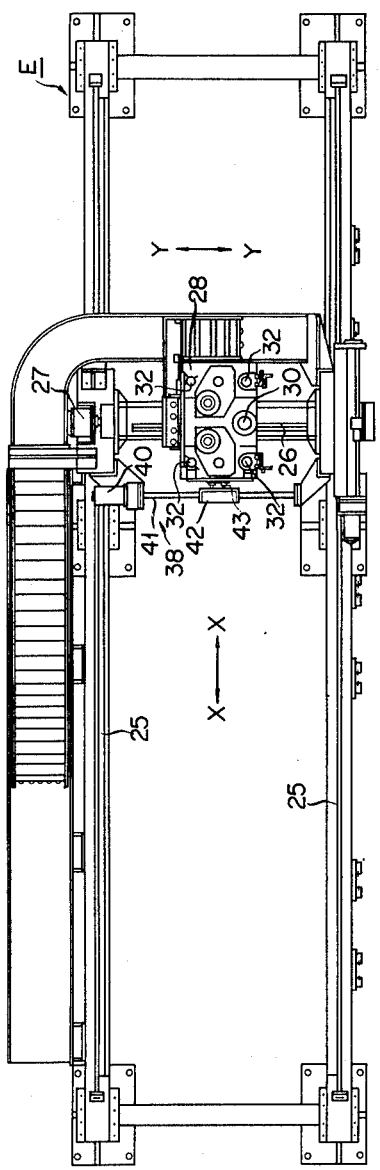
FIG. 5 is a plan view of a manipulator.

Referring to FIG. 5, a dog 42 is moved to a desired position by the actuation of a pulse motor 40 which is controlled by the computer. Then a travelling power source 27 is actuated by a signal of the computer for moving positioning means 38 along the Y axis. When a limit switch 43 comes in contact with the dog 42, the positioning means 38 is brought to a stop.

By provision of the manipulator E, a workpiece can be moved longitudinally and transversely (in the directions of X and Y axes) or can be lifted or gyrated. Further, after the workpiece clamping position is adjusted depending on the kinds of workpieces, the workpieces can be sent to a working station.

Figure 8:
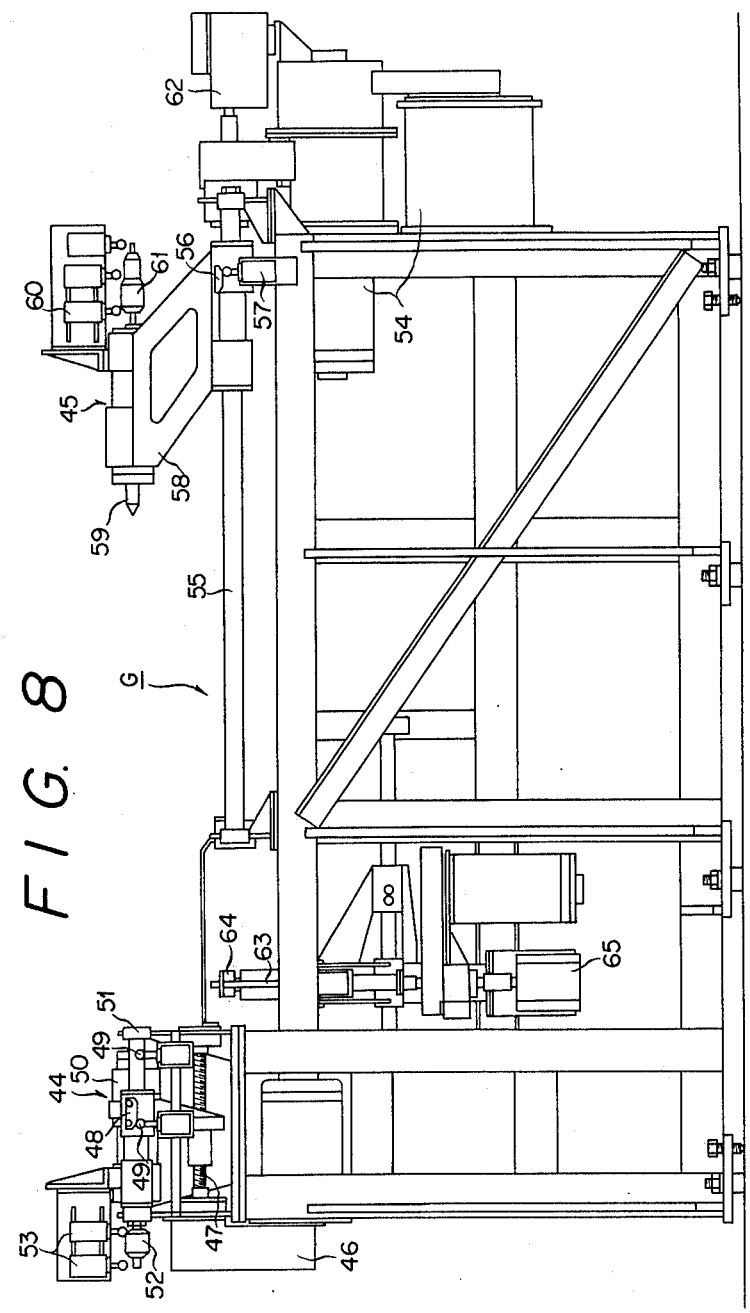
FIG. 8 is a front view of longitudinal workpiece positioning and detecting means.

D. Longitudinal work positioning and detector means (Refer to FIG. 8)

This device is a means for measuring and detecting workpieces such as shafts, etc. and serves to correct the longitudinal position of a workpiece such as shafts, etc. and detect different kinds of workpieces.

This device comprises as principal components thereof, oppositely arranged head clamp portion 44 and tail clamp portion 45.

The head clamp portion 44 comprises a casing 50, which is axially movable by means of a driving power source 46 and a ball screw 47 and the movement of which is detected and controlled by means of a dog 48 and a limit switch 49. A spring center 51 is freely slidable relative to the casing 50 and is biased by a spring on the other side in the longitudinal direction. A dog 52 and a limit switch 53 are located in the vicinity of one end of the spring center 51 and are adapted to contact each other, thereby generating a sequence signal when the spring center 51 is moved.

The tail clamp portion 45 comprises a casing 58 which is axially moved by a ball screw 55 when the latter is driven by a driving power source 54 and the movement of which is detected and controlled by a dog 56 and a limit switch 57. A spring center 59 is freely slidable relative to the casing 58 and is biased by a spring on one side in the longitudinal direction. A dog 61 and a limit switch 60 are located in the vicinity of one end of the spring center 59 and are brought into contact with each other, thereby generating a sequence signal when the spring center 59 is moved, and a revolution detector means 62 is located at one end of the ball screw 55 to indicate the number of revolutions thereof.

When a workpiece is brought in by the manipulator E, the left and right casings 50 and 58 can move in the opposite directions, so that the spring centers 51 and 59 clamp the workpiece.

The movements of the casings 50 and 58 in the opposite directions are then stopped by the contact of the dog 48 with the limit switch 49 and the contact of the dog 56 with the limit switch 57 respectively, and at the same time, an unclamp signal is sent to the manipulator E.

When the casings 50 and 58 are advanced again, the spring centers 51 and 59 will move backwardly to allow the dog 52 to contact the limit switch 53 and also allow the dog 60 to contact the limit switch 61, thereby completing positioning of the workpiece.

The amount of movement of the casing 58 from its original position is then measured by means of revolution detector means 62, and based on the measured value, the length of the workpiece can be measured.

Reference numeral 63 indicates an elevating member provided with a contacting and sensing member 63 mounted so as to freely move vertically toward a line connecting the center line of the spring center 51 for the head clamp portion 44 and that of the spring center 59 for the tail clamp portion 45. Further, measuring means 65 is provided, which measures the distance which the elevating member 63 travels. By such arrangement, the outside diameter of the workpiece on one side in the longitudinal direction is measured to detect whether or not a shaft part having different outside diameters at left and right ends thereof is correctly positioned.

E. Means J for measuring the overall length and depth of the center hole of the workpiece after milling and centering workpieces which are completed.

The measuring means J is formed as an integral part of the above-mentioned workpiece positioning and detector means G, and its operation is the same as mentioned hereinabove.

Figure 9:
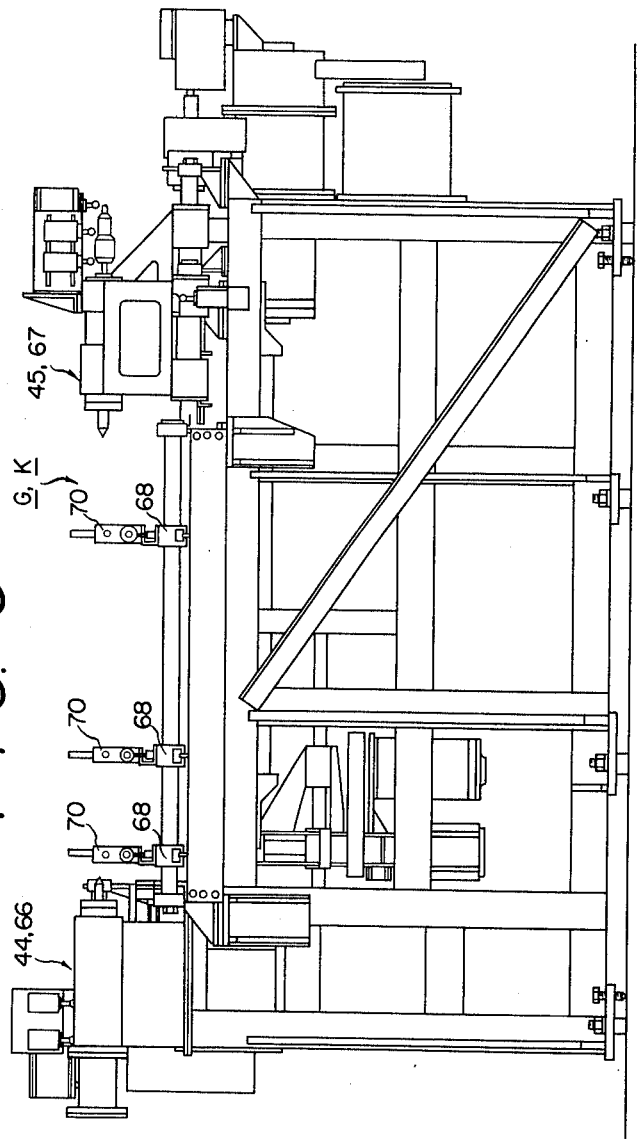
FIG. 9 is a front view of an outside diameter measuring means.
Figure 10:
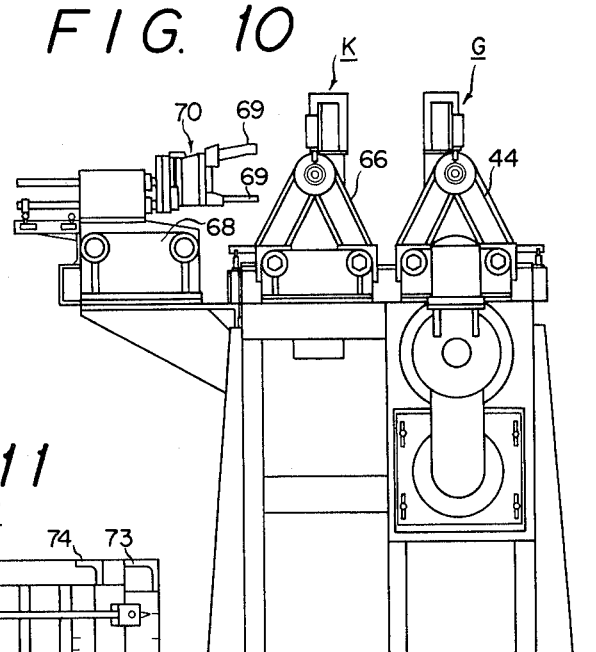
FIG. 10 is a side elevational view of the outside diameter measuring means of FIG. 9.

F. Outside diameter measuring means K (Refer to FIGS. 9 and 10)

The outside diameter measuring means K is formed as an integral part of the workpiece positioning and detector means G. Means K comprises a head clamp portion 66 (formed as an integral part of the head clamp 44), a tail clamp portion 67 (formed as an integral part of the tail clamp portion 45), and movable members 68 mounted therebetween so as to reciprocate longitudinally, each of the movable members 68 including an outside diameter measuring means 70 having a pair of measuring members 69, each being adapted to vertically open and shut. The outside diameter measuring means 70 is mounted on the movable member 68, so as to freely reciprocate in a direction at right angles to the direction of movement of the member 68. Thus, a finished shaft part is supported between the head clamp portion 66 and the tail clamp portion 67 and its outside diameter is measured by the pair of measuring members 69.

G. Disposal of chips

The chips produced by the machine tools are discharged by the sub-chip conveyor H into the main chip conveyor I extending in the groove on the floor surface of the pallet conveyor means A. For the sub-chip conveyor H, a magnetic screw conveyor, a screw conveyor or a small-sized vibratory conveyor can be employed. The main chip conveyor is of a vibrating type.

It is substantially necessary to make the chips produced in the machine tools in a shape to be readily disposed of. Therefore, it is essential to adjust the amount of cutting (particularly in case of finishing work, a maximum amount of cutting should be set which assures dimensional accuracy) or to form a spiral groove before effecting finishing work, so as to break the chips at the portion thereof crossing over the groove with one revolution of the workpiece when finishing the workpiece.

H. Machines and equipment inside control room L

In the control room L, there are a series of machines and equipment including a computer which send control signals to the associated devices to render the latter operative.

Moreover, a computer's back-up system is installed which comprises data input units such as a console typewriter (for giving control instructions for starting and ending the operation of the system, dumping and correcting data and program), a card reader (for reading schedule cards and file data) and a tape reader (to be used when debugging is made — program tape reader) etc., data output units such as console and logging typewriters (for reading and printing error messages, typing cores of proof list, drum dump, and program tape), a card puncher (for making outputs of actual data in a card form), a line printer (to be used when debugging is made — for printing program listing and dump), and a tape puncher (to be used when debugging is made — for making a program tape) etc.

Figure 11:
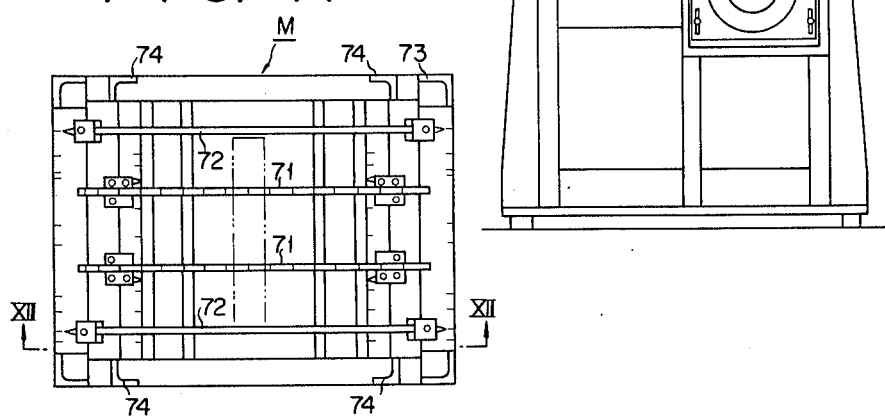
FIG. 11 is a plan view of a pallet.
Figure 12:
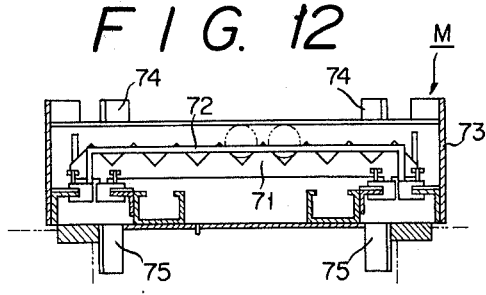
FIG. 12 is a sectional view of the pallet shown in FIG. 11.

I. Pallet M (Refer to FIGS. 11 and 12)

The pallet M comprises a pair of workpiece rests 71, each having a saw-tooth shaped upper surface, a pair of partitioning plates 72 mounted on the workpiece rests to limit the longitudinal movement of the latter and outer frames 73. The workpiece rests 71 and the partitioning plates 72 are freely slidable in the transverse direction while maintaining a parallel relationship. Positioning members 74 are adapted to be fitted on the upper surfaces of the outer frames 73, and legs 75 are adapted to be fitted on the lower surfaces of said outer frames 73. Therefore, when it is desired to store different kinds of workpieces, only one kind of pallet is required. This pallet is suitable for general purposes and is very easy for effecting maintenance and repairs. Further, storing workpieces having a different length can be accomplished by setting the positions of the partitioning plates 72 to limit axial movement of the workpiece, so that the workpiece can be stored in good order. Moreover, the pallets can be stacked in a completely stable condition by engaging a plurality of outer frames 73 and positioning members 74 and legs 75.

The flow of shaft parts to be worked in the system will now be described below.

Assume that empty pallets M and pallets M, each having blank or unfinished shaft parts loaded thereon, are stored on the storing shelves 3 of the pallet storing means B.

When an unfinished shaft part is taken into the automatic article working system, the operator depresses the switch for calling an empty pallet on the taking-in and taking-out operating panel O installed adjacent to the pallet transfer device C. An operational instruction is then sent to the pallet conveyor means A, so that an empty pallet M stored in the pallet storing means B is conveyed by the pallet conveyor means A to taking-in and taking-out gate N and is taken out by the pallet transfer device C to its operative position P. Then, the taken out pallet M is loaded with blank shaft parts. The shaft parts are positioned on the pallet M in a stable condition by the workpiece rests 71 and the partitioning plates 72. Thereafter, the pallet M is moved by means of the pallet transfer device C to the gate N and is stored by the pallet conveyor means A in a vacant position on the pallet storing means B. When the pallet M is called out by the machine tool $F_1$, it is transferred by the pallet conveyor means A to the gate of the initial work step, i.e., the lower storing shelves 3 of the rack portion 17 of the pallet transfer and storing means D and waits there. When the shaft part loaded on the previous pallet M has been worked and is moved by the pallet transfer and storing means D to the upper storing shelves 3 of the rack portion 17 of the pallet storing means B, the above-mentioned waiting pallet M is pulled out by the pallet moving member 24 of the pallet transfer and storing means D to the developing portion 18, i.e., into the range of action of the manipulator E. The shaft parts on the pallet M are taken out one by one by means of clamping pawls 33 and 34 of the manipulator E, so as to be transferred to the workpiece positioning and detector means G. After the shaft parts are exactly positioned, whether or not they are the same in shape and are placed in a correct longitudinal direction, they are checked by means G. They are then conveyed again by the manipulator E to the machine tool $F_1$ where milling and centering work is effected. Worked shaft parts are taken out again by the manipulator E and are transferred to the device J for measuring the overall length of shaft parts and the depth of the center hole thereof. After measurements of the overall length and the center hole depth are made, the shaft parts are placed in their original positions on the pallet M. When the overall length of the shaft parts and the center hole depth thereof are not within the specified limit, they are separately treated as off-specification. When all the shaft parts on the pallet M have been worked by repeating the above-mentioned cycle, the pallet M is moved by the pallet moving member 24 of the pallet transfer and storing means D to the rack portion 17 of the pallet conveyor means A. Then, the pallet M is transferred by the pallet conveyor means A to a vacant position on the pallet storing means B where it is stored to wait for subsequent work steps. Thereafter, the pallet M is conveyed to a machine tool where the shaft parts are subject to working in a similar manner as mentioned above. When all the work steps required for shaft parts have been completed by repeating such operations, the pallet M is stored in a vacant position on the pallet storing means B. As and when required, the pallet M is conveyed by the pallet conveyor means A to the taking-in and taking-out gate N, and is taken out by the pallet transfer device C outside the automatic article working system. Then, finished shaft parts are removed from the pallet M. Subsequently, the pallet M is stored again in a vacant position in the pallet storing means B by the same operation as mentioned above.

Thus, a plurality of shaft parts are loaded on a pallet unit and are conveyed to machine tools F, so as to be subjected to working. When there is a restriction in the working sequence, working is made in accordance with the sequence, and in case of other working steps, shaft parts are conveyed in turn to an idle machine tool to be subjected to working.

Now, work step controls of the automatic article working system will be described below. The work step control of this system is classified into a control of taking-in of articles to be worked in the system and a control of working of articles inside the system.

The former serves to decide the timing of taking blank workpieces in the automatic article working system (by kinds of workpieces) taking into account three points, i.e. improvement of the rate of operation of the system, guarantee of the date of delivery and reduction of lead time. The timing of taking blank workpieces into the system is periodically calculated by a computer installed outside the system, taking into account the basic production scheme and the present condition of the system.

The latter serves to obtain a most efficient flow of articles to be worked taken in the system to improve the rate of operation of the system and reduce lead time. Its efficient operation can be achieved by making the most use of the order of priority in the working sequence required by articles to be worked and the degree of freedom. (Working does not have to be done in order.) Waiting sequence is made by pallets as described below.

a. Renewal of sequence of completion of waiting.
   b. Incorporation of sequence which can be unconditionally effected into waiting.
   c. Checking of conditions.
   d. Incorporation of conditioned sequence into waiting in the case of meeting conditions. The determination of the next pallet to be received in the rack portion 17 of the pallet transfer and storing means D is made as follows.
   a. Checking of pallets loaded with articles capable of being urgently worked.
   b. As a result of checking, pallets loaded with articles capable of being worked are taken in the rack portion 17.
   c. Otherwise, investigation is made in the file for waiting to find an available working sequence.
   d. Investigation of pallets loaded with articles capable of being worked based on the result of investigation (c), and taking the pallets in the rack portion 17 of the pallet transfer and storing means D.
   e. Nothing is done when there is no pallet loaded with articles to be worked.

Since the present invention is constituted as mentioned above, a plurality of articles to be worked can be loaded on predetermined pallets M depending on the size and shape thereof, respectively, and then the pallets M are conveyed by the pallet conveyor means A to respective machine tools F where working of the articles to be worked is effected.

Therefore, in the case of limited production of a variety of articles, articles of the same shape to be worked can be transferred between the machine tools F by loading the articles on the pallet M and conveying it, so that a limited production of a variety of articles can be automatically effected by the efficient and simple control means.

Further, since the pallets M are stored on the storing shelves 3 of the pallet storing means B and wait there, and the machine tools F are all directly connected by the pallet conveyor means A, a waiting and stored pallet M can be conveyed to a machine tool F, which has completed its work on other articles where working of the articles on the pallet can be effected.

Therefore, when a machine tool F has completed its operation, a waiting pallet M can be directly conveyed to the machine tool F for working the articles, so that the waiting time for the machine tool F can be reduced. Further, the pallet M can be conveyed to any one of the machine tools F and the work step and sequence can be altered to some extent. Therefore, even when one machine tool F is stopped due to changes in steps, tool replacement or breakdown, etc., other machine tools F can be used for working the articles, so that the rate of operation of the automatic article working system can be remarkably improved.

Further, a plurality of articles is loaded on a pallet M and the pallet M is conveyed as one unit, so that the initial investment and the running cost of the conveyor means are low, while work step controls are made by a pallet M, so that the capacity of the computer required for the control machines and equipment can be reduced.

Moreover, the pallet storing means B are located on both sides and in the direction of movement of the pallet conveyor means A, so that the distance of movement of the pallet M can be reduced, and the gate N can be used for taking the pallet M in and out from the automatic article working system, whereby the extent of operation of the operator can be minimized.

Further, all the devices are controlled by a series of control units including a computer as the heart thereof, and it is only necessary for the operator to place articles to be worked on the pallet M. The other operations are all automatically controlled. Still further, the pallet storing means B has vertical storing shelves 3, so that the floor space occupied by the pallet storing means B can be minimized, whereby the space required can be reduced.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims rather than the foregoing description, and all changes which come within the meaning and range of equivalency of the claims are, therefore, to be embraced therein.

We claim:

1. An automatic article working system which comprises:
   a. a plurality of pallets for loading articles to be worked, each of said pallets conveying the articles to be worked;
   b. pallet conveyor means for conveying said pallets, said conveyor means being movable along a horizontal path and in the vertical direction;
   c. pallet storing means located on both sides of said path;
   d. a plurality of machine tools provided adjacent to said pallet conveyor means;
   e. pallet transfer and storing means provided between said machine tools and said pallet storing means for moving said pallets in and out of said pallet storing means, said pallet transfer and storing means including a rack portion to deliver the pallet to said pallet conveyor means;
   f. manipulator means provided between said pallet transfer and storing means and said machine tools, said manipulator means transfering the articles to be worked on a taken-out pallet between said machine tools and said pallet, said pallet transfer and storing means further including a developing portion for moving said pallet into the range of said manipulator means; and,
   g. computer means operatively connected to all of said means for controlling the operation thereof.

2. An automatic article working system as claimed in claim 1, wherein said pallet storing means includes pallet storing shelves, said pallets being adapted to be removed from said pallet storing shelves.

3. An automatic working system as claimed in claim 2, wherein said pallet storing shelves are positioned along said path on both sides thereof.

4. An automatic article working system as claimed in claim 1, wherein said pallet conveyor means includes a vertically movable pallet loading table, pallet detector means mounted on said pallet loading table and rails positioned along said path, wherein said pallet conveyor means moves along said rails.

5. An automatic working system as claimed in claim 1, wherein said rack portion includes a plurality of storing shelves and wherein said developing portion includes an elevating base, a lifter means for raising and lowering said elevating base, and a pallet moving member for transfering pallets to and from said storing shelves.

6. An automatic article working system as claimed in claim 1, wherein said manipulator comprises a horizontally movable carriage, a vertically movable carriage mounted on said horizontally movable carriage at right angles thereto, a holding member secured to said vertically movable carriage, wherein clamping pawls are rotatably mounted on said holding member for clamping an article to be worked.

7. An automatic working system as claimed in claim 1, including work positioning and detector means for correcting the position of said article and for detecting the shape of said article.

* * * * *